Patented Aug. 28, 1945

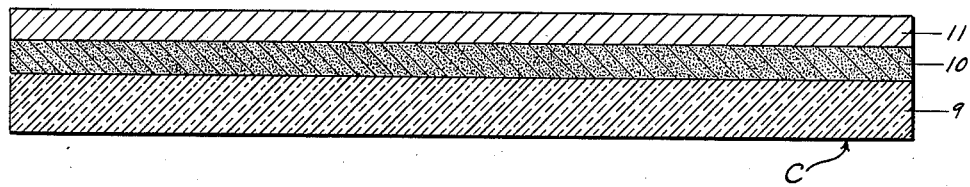
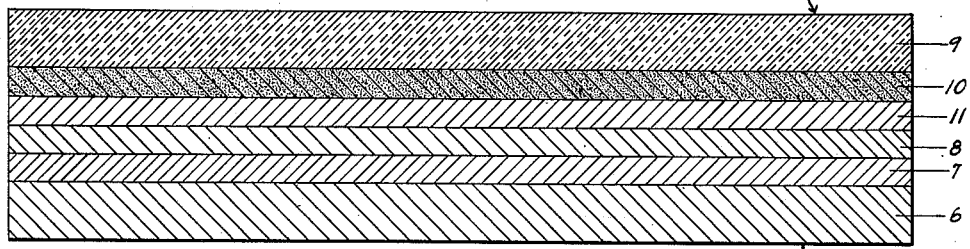
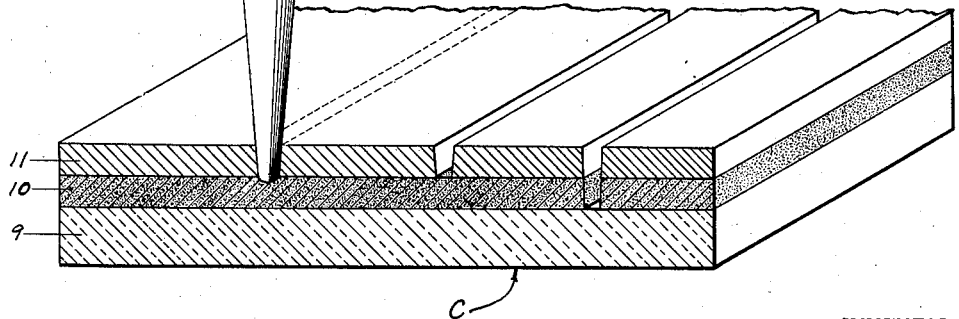
INVENTOR.
Benjamin Rudnick
BY
ATTORNEY

2,383,567

UNITED STATES PATENT OFFICE 2,383,567

METHOD OF MAKING NEGATIVES FOR LINE REPRODUCTION

Benjamin Rudnick, Huntington, N. Y., assignor to Republic Aviation Corporation, a corporation of Delaware Original application May 21, 1941, Serial No. 394,403. Divided and this application February 13, 1943, Serial No. 475,787

11 Claims. (Cl. 41—46)

This invention relates to a method of making negatives for line reproduction by which inscriptions, designs, or other graphic characters or delineations may be transferred from one surface to another quickly, accurately and repeatedly, and is a division of application, Serial No. 394,403, filed May 21, 1941, which matured into Patent Number 2,321,249 on June 8, 1943.

The present invention contemplates the creation of a permanent negative capable of receiving clear, sharp and distinct delineations or inscriptions, such for example as line drawings, which may be employed for the repeated reproduction of such inscriptions or delineations upon a photographically light-sensitive positive.

The instant invention resides essentially in the application of an opaque mask to a transparent base sheet which mask is removed as a result of the delineation of a design on the negative to expose the transparent base thereby creating a negative having clear or transparent lines surrounded by an opaque field.

Among its other objects the present invention has in view a complete line-for-line reproduction from the negative resulting from the present method, the lines of the reproduction being exact replicas of the lines in the negative, and the elimination of all roughness and irregularities in the line, as well as any diffusion resulting from refraction of the light employed in contact printing which diffusion of light would reproduce a widened or irregular line.

Other objects and advantages will be apparent from the following detailed description of the preferred mode of carrying out the method of my invention, reference being had to the annexed drawing in which:

Figure 1 is a cross-sectional view of a negative prepared according to the preferred method;

Figure 2 shows the preferred manner in which the negative of Figure 1 and the positive B are arranged during their exposure, and Figure 3 is a sectional perspective view of negative material made in accordance with the present invention showing the several successive steps by which it is converted into a photo-mechanical negative.

Primarily the reproduction which results from the use of the negative prepared in accordance with the teachings of the present method is accomplished by using said negative in the light contact printing, a printing method well known in the photographic arts long prior to this invention. The instant invention is concerned only with the creation of a negative which, when it has received the delineation of a drawing or design, becomes the equivalent of the standard photographic negative commonly employed in contact printing. However, for the reproduction of mechanical layouts or drawings where the layout or drawing is made directly upon the negative it has been found that the negative must have certain characteristics in order to meet the requirements of extremely accurate, clean, clear and precise reproduction, to-wit: it must be dimensionally stable; it must, in receiving the delineation of a design or drawing to be reproduced, create a transparent line of uniform width or thickness, clear cut and having no irregularities or variations therein, it must constitute and be able to comprise a permanent record capable of repeated handling and reproduction as well as storage without deteriorating or becoming damaged; and it must be capable of receiving and accepting corrections, changes and alterations in the design or drawing originally delineated thereon or be susceptible of correction and alteration during the delineation of a design or drawing thereon.

The end result of this method comprises a negative C having a transparent base or backing sheet 9. This sheet 9 may be glass or any adaptable synthetic resin plastic or equivalent material having dimensional stability and the capacity of freely transmitting light rays. One face of the backing sheet is completely covered by an opaque mask totally and completely impervious to the passage or transmission of light rays. This mask comprises the substantially individual coatings or layers 10 and 11. The coating 10 situated next to the backing sheet 9 is completely opaque and hence prevents the passage of light through the backing sheet 9. This opaque layer or coating 10 can be readily and cleanly fractured or removed from the backing sheet 9 and is held in place and protected from removal, disfigurement, or fracture by the overlying binding layer 11 which may be clear or pigmented.

These layers 10 and 11 combine to create a mask for the transparent backing sheet 9, the opacity of which results primarily from the characteristics of the masking coating 10 but may be supplemented by the opacity, if any, of the binding coating 11.

The masking coating 10 comprises a quantity of extremely pulverulent opaque material, such as extremely finely powdered aluminum, and a vehicle which may be nitrocellulose dissolved in suitable solvents diluted to produce a lacquer of the desired consistency. The percentage of the lacquer vehicle to the quantity of the pulverulent pigment, such as aluminum, in the opaque layer 10 is very small, only enough lacquer or vehicle being employed to lightly adhere the minute grains of the pigment one to the other and the whole film to the surface of the backing sheet 9. To this extent the opaque coating 10 may be said to have very little cohesion and adhesion and therefore is unstable or frangible.

If the coating or film 10 were unprotected, handling would disturb and dislodge portions or all of the film or coating and it would disintegrate. Therefore, the binding coating or layer 11 is provided and functions to provide a binder and shield for the coating 10, an easily scribed vehicle to receive and record the delineations of drawings or designs, a surface capable of receiving and retaining pencil marks, and when desired, a surface not incompatible to light sensitive photographic emulsions and the adherence thereof to the surface. In this layer 11 the same vehicle is employed, to-wit nitrocellulose resin combined and dissolved in suitable solvents and diluents to produce a lacquer vehicle of the proper consistency. A pigment is employed in this binding coating or layer 11 solely for the purpose of creating a contrasting color for the observation of lines delineated upon and through its surface and to overcome any glare or reflection from the masking coating 10. Aside from accomplishing these purposes the binding and shielding coating 11 may be perfectly clear. Since this shielding and binding coating 11 must be fractured or grooved and since its outer surface must readily receive pencil markings, and as it must resist wear, tear and manipulation and in so doing protect the underlying opaque coating 10, it must have certain strength and yet be fracturable evenly and uniformly without leaving ragged edges. A pigment is hence included in the vehicle but in this coating 11 the percentage of the vehicle or lacquer to the quantity of the pigment is far greater than the percentage of the vehicle or lacquer to the aluminum powder or pigment in the opaque coating 10. This results in a far stronger coating having the required surface as above pointed out and more securely and permanently adhered to the underlying coating 10 and the backing sheet 9. The vehicle of the coating 11 may be pigmented by material which will overcome the reflection from the aluminum of the coating 10, such as finely powdered tin or any other suitable pigment. It is desirable that the pigment employed in the shielding and binding coating 11 be finely pulverulent so that this coating will fracture or groove cleanly and precisely when a drawing or design is delineated by scribing through it, the removed minute particles of pigment bodily separating from each other and from the mass of the coating along a sharp line, as the scribing operation does not tear the coating 11 or disturb it at any point beyond the limits of the scribed mark. The resulting coating 11 has a color which destroys the glare or sheen from the opaque layer 10 and so contrasts with the color of both the coating 10 and of normal pencil marks that accurate observation of lines drawn or scribed on or through the coating 11 is fully equal to the observation of similar lines where other and more conventional materials are used.

Both of these coatings 10 and 11, which combine to mask the backing sheet 9, are sprayed or otherwise applied to the transparent backing sheet 9, the coating 10 being allowed to dry thoroughly before the coating 11 is applied, and the coating 11 being allowed to thoroughly dry before any delineation of drawings or designs on and through it.

The manipulation of the earlier steps in the present method of making a negative, to-wit: the successive coating or application of the coatings 10 and 11 to the backing sheet 9, results in a complete opaque mask on the one surface of the backing sheet 9. While any method of application may be employed, it has been found that these coatings 10 and 11 may be successively applied to the backing sheet 9 with the usual spray gun. As the percentage of vehicle in the opaque coating 10 is relatively small, there is substantially no cohesion between the particles of the undercoating 10 and very little adhesion of the film or undercoating 10 as a whole to the backing sheet 9. In short, there is only sufficient adhesion between the film 10 and the backing sheet 9 to hold the former intact upon the latter until the binding coating 11 is applied thereto and dried. The application of a vehicle carrying the pulverulent grains or minute particles to the sheet 9 to create the opaque undercoating 10 probably causes the minute particles contained in the lacquer vehicle to slightly overlap and to build up the opaque film. Of course the particles themselves are opaque and therefore a multiplicity of overlying particles increases the opacity or makes assurance doubly assured that the opacity of the layer 10 is complete and unbroken.

When the opaque coating 10 is thoroughly dried, the binding coating 11 is applied thereto. The vehicle of the binding coating 11 is of the same character as the vehicle that is employed in the underlying opaque coating 10, and will penetrate or coact with the underlying coating 10 to increase its original inherent cohesion and adhesion as above noted.

To delineate a design or drawing on the negative sheet prepared as aforesaid, a metallic stylus is used and the lines of the delineation are cut or scribed therewith through the outer coating 11. Thus the scriber removes and cuts through a coating 11 in the form of the design or drawing to be reproduced, thereby creating a groove or series of grooves through this coating 11. The groove or grooves resulting from this scribing operation exposes the opaque undercoating 10 which then may be removed in correspondence with the groove or grooves created by the scribing aforesaid by brushing or erasing the particles of said coating 10 thereby uncovering or revealing the transparent backing sheet 9 in registration or alignment with the groove or grooves in the binding coating 11.

Since the opaque coating 10 principally consists of a multitude of small fragments or dust particles of aluminum or other opaque material or pigment, this coating partakes of the color of the aluminum particles or other opaque pigment employed in the coating, and this color usually presents an unsatisfactory drawing surface and gives very poor contrast to pencil marks or to the transparent parts of the backing sheet 9 exposed by the scribing of the mask 10—11. Hence pigment is incorporated with the binding coating 11, which would otherwise require no pigmentation. The nature of the pigment in the binding coating 11 is such that the removal thereof by the scribing operation will in result and principle be like the removal of the opaque coating 10.

The removal of this coating 10 in correspondence with the groove or grooves formed in the outer binding coating 11 because of the unstable nature thereof is accomplished by a brush or eraser whereby only those particles of opaque pigment in alignment with the groove or grooves in the outer binding coating 11 are removed, leaving the remaining particles undisturbed. The scribing operation or step removing the outer coating 11 does so evenly and smoothly so that the coating 11 remaining a part of the negative is not broken, checked or disturbed. Thus the line to be reproduced is created clearly and sharply in the form of a groove in each layer 10 and 11 which grooves are in exact registration and of the same width throughout.

As the binding coating 11 is easily fractured by the scriber, the force employed in so fracturing it is not sufficient to appreciably break or go through the opaque inner coating 10. Hence the surface of the transparent sheet 9 is fully and completely protected from contact with the scriber which might scratch or groove the surface of the sheet 9 to some degree if contact were established during the scribing operation. If that occurred, light passing through the negative from the coated side thereof would strike the scratch in the transparent sheet 9 and would thereby be refracted to create diffusion and a widened irregular line in the print made from the negative. This would not. however, occur when the light passed through the negative from the uncoated side because the light rays before reaching the positive would, in that event, be sharply confined by the registering grooves in the coatings 10—11 but since the negative is used for reproduction purposes with the light for contact printing passing through it from either side it is of course necessary to prevent any scratches in the material of the sheet 9.

In Figure 2 of this drawing is shown a positive B, particularly designed for use with the present negative comprising a backing sheet 6 of metal, fabric, paper, glass, synthetic plastic, wood, or any other suitable material, or it may constitute the actual work to be operated upon. One face of the backing sheet is cleaned. A coating of priming material 7 is then painted or sprayed over the cleaned surface, the primer serving both as a filler for closing the pores of the material composing the backing sheet, and as a protective shield between the backing sheet and the emulsion which is subsequently applied thereto, and which otherwise might interact chemically with the backing material. I prefer to use as the primer a suspension of zinc chromate in a carrier selected with consideration to the nature of the material composing the positive. When the positive is composed of a metal such as steel, both of its faces, as well as its edges, will be covered with the primer to avoid contamination of the chemicals employed in the subsequent developing operation.

The positive is next placed in a dark room illuminated, for example, by a ruby safelight of the type well known to photography; the temperature is maintained substantially constant and an emulsion 8, consisting, for example of a light-sensitive material, such as silver nitrate suspended in a gelatinous vehicle, is melted and applied as a film in any suitable manner giving an even thickness, though I prefer to apply it with a low-pressure spray gun smoothly and uniformly over the primer coating. The thus-prepared sheet is then passed through a chilling chamber causing the emulsion to jell, after which it is placed in a dryer.

The prepared positive B may be used as soon as it is dry, or it may be stored away in a light-tight cabinet for future use. In transferring the drawing from the negatively prepared surface (as will be described in detail hereinafter) of a negative sheet C (Figure 1) to the positively prepared surface of the positive B, the pattern sheet is placed upon a flat, solid support in a dark room, treated face up, and the positive is superimposed upon the pattern sheet with its treated face held firmly in engagement with the treated face of the negative to insure absolute contact therebetween. Under such conditions, the light rays emitted during the exposure act photographically upon the light-sensitive emulsion and cause the silver salts to be sufficiently affected usually in about one and one-half to two minutes. The thus-exposed positive B, is finally removed and treated with the usual developing and fixing solutions in a manner which is well-known to the photographic art, and then washed and dried. Because the negative surface is not affected by said exposure, a great number of copies of the drawing may be reproduced therefrom in a single dark room operation.

The term "design" as used throughout the specification and claims is intended to include not only pictorial delineations, but also inscriptions, written and printed indicia, maps, charts, mechanical layouts, etc.

Manifestly various other modifications in the foregoing method may be made by those skilled in the art without departing from the spirit of my invention as defined in the following claims.

I claim:

1. The method of making a negative for line reproduction consisting of providing a transparent backing sheet with an opaque, frangible undercoat, applying an outer coat thereto, delineating a design to be reproduced by scribing the lines representing the design in the form of grooves extending through said outer coat, and removing those portions of the undercoat in alignment with the aforesaid grooves thereby exposing corresponding portions of the transparent backing sheet.

2. The method of making a negative for line reproduction consisting in providing a transparent backing sheet with an opaque, frangible coat relatively non-cohesive and only slightly adhesive to the backing plate, applying an outer coat of protecting and binding material to said undercoat, delineating a design to be reproduced in the form of grooves scribed through the outer coat, and removing those portions of the undercoat in direct alignment with said grooves, thereby exposing corresponding portions of the transparent backing sheet and leaving the remainder of the undercoating undisturbed.

3. The method of making a negative for line reproduction consisting in adhering an opaque undercoating comprising mainly powdered metal and a binder to a transparent backing sheet, applying an outer coating comprising mainly the aforesaid binder over said undercoating, delineating a design to be reproduced by scribing the lines representing the design in the form of grooves, extending through both the under and outer coatings and exposing portions of the backing sheet corresponding to said grooves.

4. The method of making a negative for line reproduction consisting in lightly adhering a relatively unstable, opaque undercoating to a transparent backing sheet, applying a relatively stable outer coating completely over said undercoating, scribing grooves through the outer coating, and removing those portions of the undercoating in alignment with said grooves, thereby exposing the corresponding portions of the backing sheet.

5. The method of making a negative for line reproduction consisting in depositing a frangible, opaque masking layer comprising a finely powdered aluminum and a relatively small quantity of lacquer on a transparent backing sheet, covering said masking layer with a binding layer comprising a relatively large quantity of lacquer, and removing both of said layers in correspondence with the lines to be reproduced to exposed aligned portions of the backing sheet.

6. The method of making a negative for line reproduction consisting in depositing a masking layer comprising opaque particles and lacquer on a transparent backing sheet, covering said masking layer with a binding layer comprising lacquer and a pigment, the ratio of lacquer to opaque particles in the masking layer being less than the ratio of lacquer to pigment in the binding layer, and removing the both layers in correspondence to the design to be reproduced to expose aligned portions of the backing sheet.

7. The method of making a negative for line reproduction consisting in depositing a masking layer composed principally of opaque particles combined with a relatively small quantity of lacquer on a transparent backing sheet, covering said masking layer with a lacquer binding layer, and removing both layers in correspondence to the design to be reproduced thereby exposing aligned portions of the backing sheet.

8. The method of making a photo-mechanical negative consisting in compounding finely powdered opaque material with a relatively small quantity of lacquer dissolved in a volatile solvent and diluted to spraying consistency, spraying the resulting compound on one surface of a transparent backing sheet to deposit an opaque masking layer mainly comprising the powdered opaque material lightly adhered to said sheet, and covering said masking layer when dry with a lacquer binding layer.

9. The method of making a photo-mechanical negative consisting in compounding finely powdered metal with a relatively small quantity of nitrocellulose, depositing this compound on one surface of a transparent sheet in a comparatively thin masking layer mainly comprising powdered metal lightly adhered to said sheet, depositing a binding layer of nitrocellulose on said masking layer, and delineating a design to be reproduced in the form of grooves extending through both layers to expose the underlying transparent sheet.

10. The method of making a photo-mechanical negative consisting in compounding finely powdered aluminum with a relatively small quantity of nitrocellulose dissolved in a volatile solvent and diluted to spraying consistency, spraying the resulting compound upon one surface of a transparent backing sheet to deposit the powdered aluminum in a relatively thin opaque masking layer lightly adhered to said sheet, and spraying said masking layer when dry with a mixture of nitrocellulose and a volatile solvent diluted to spraying consistency to create a binding layer covering and protecting the masking layer aforesaid.

11. The method of making a photo-mechanical negative for line reproduction consisting in compounding finely powdered aluminum with a relatively small quantity of lacquer comprising nitrocellulose and solvents diluted to spraying consistency, spraying the resulting compound on one surface of a transparent backing sheet to deposit a relatively thin, opaque, friable masking layer of aluminum, covering said masking layer of aluminum on said sheet with a binding layer by spraying it with a lacquer comprising nitrocellulose and solvent diluted to spraying consistency, and scribing the lines to be reproduced through both of said layers to expose corresponding portions of the backing sheet.

BENJAMIN RUDNICK.